April 21, 1964
W. O. COPELAND
3,130,371
PULSE AMPLITUDE SLICING CIRCUIT
Filed Aug. 26, 1959
2 Sheets-Sheet 1
*Fig. 1.*
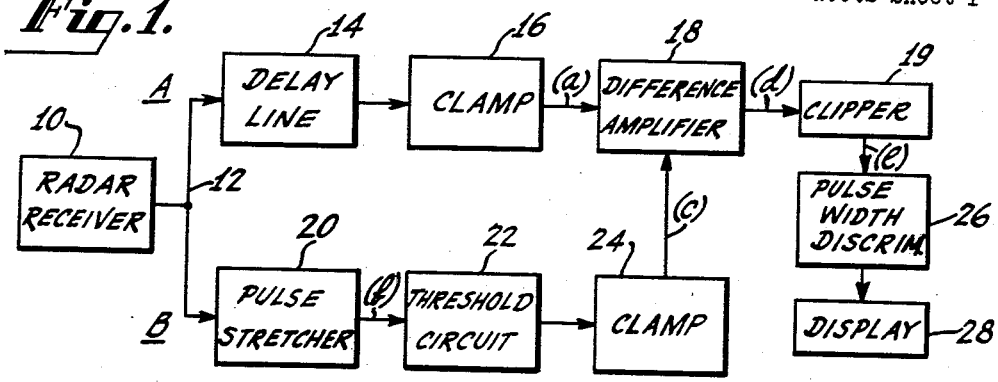
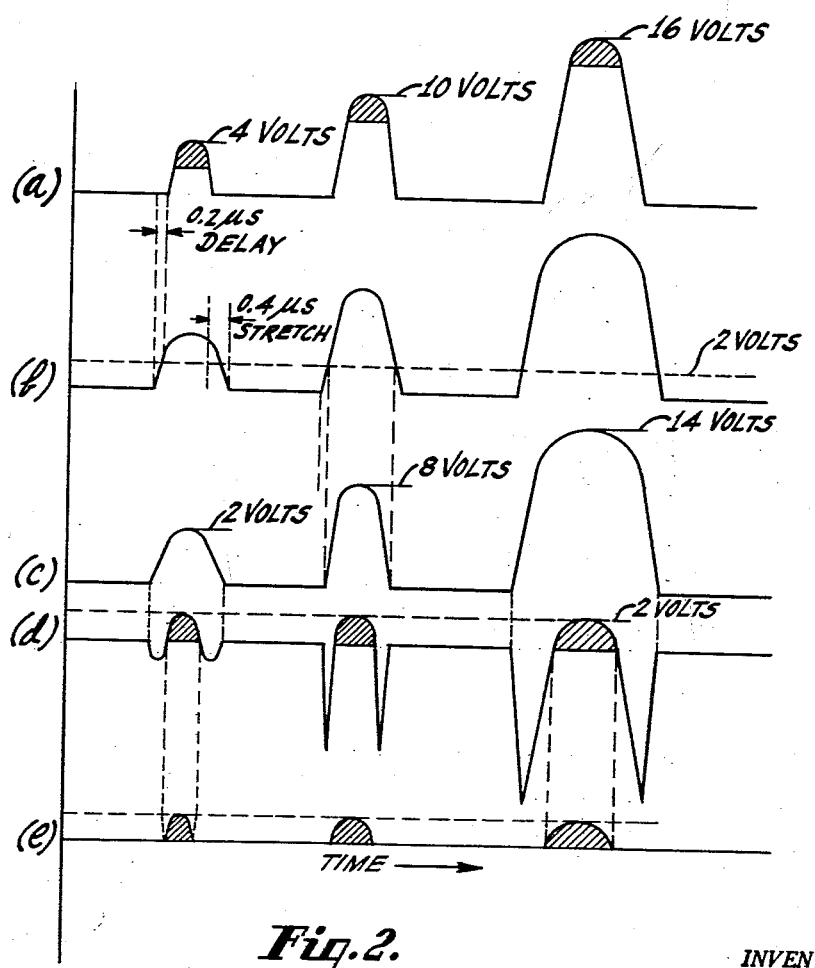
*Fig. 2.*
INVENTOR.
WILLIAM O. COPELAND
BY
ATTORNEY April 21, 1964 W. O. COPELAND 3,130,371
PULSE AMPLITUDE SLICING CIRCUIT
Filed Aug. 26, 1959 2 Sheets-Sheet 2
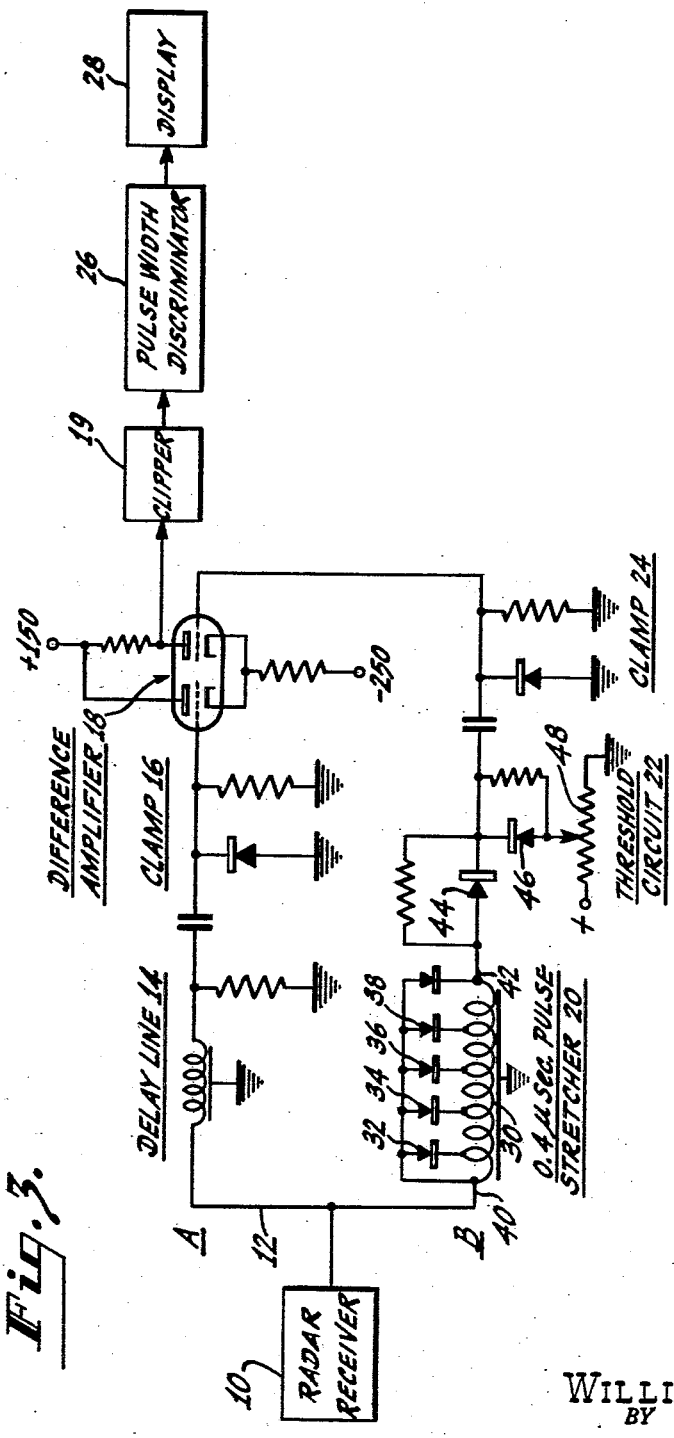
INVENTOR.
WILLIAM O. COPELAND
BY
ATTORNEY.

United States Patent Office 3,130,371
Patented Apr. 21, 1964

3,130,371
PULSE AMPLITUDE SLICING CIRCUIT
William O. Copeland, Runnemede, N.J., assignor to Radio Corporation of America, a corporation of Delaware
Filed Aug. 26, 1959, Ser. No. 836,280
2 Claims. (Cl. 328—54)

The present invention relates to a new and improved circuit for discrimniating among pulses of different amplitudes and/or widths and is particularly applicable to the problem of eliminating ground clutter in a radar system.

In radar systems generally and particularly in airborne radar systems, energy reflected from the ground produces an objectionable indication on the radar screen known as "ground clutter." If the clutter is not eliminated, its presence may be confusing first because it may be mistaken for a target of interest and second because it may produce sufficient illumination on the screen to obscure targets in the same general direction and at similar ranges.

It has been previously proposed that clutter may be eliminated by applying to the indicator only those return pulses which are narrower than a given width. A pulse width discriminator circuit may be used for this purpose. The assumption is that a ground return pulse, since it is reflected from a large area target which, in general, does not extend perpendicularly to the radiated beam will be relatively wide, whereas a target return pulse from an aircraft or the like, which can be considered as a point source compared to the radiated beam cross section, will be relatively narrow. In some applications, this solution has not been entirely satisfactory. A very large amplitude pulse, for example, may be wider at its base than a lower amplitude pulse from a similar target. Moreover, under conditions of noise, the noise may add to the pulse and make its base appear much wider than it actually is. Accordingly, the difficulty with this system is that some return pulses will look to the pulse width discriminator circuit as if they are reflected from ground whereas they are, in fact, reflected from aircraft or other targets of interest.

A general object of the present invention is to provide an improved circuit for sensing pulse width. Another object of the invention is to provide an improved circuit for eliminating ground clutter from received radar signals.

According to the present invention, the width of each return pulse is sensed, not at its base, but, instead, at its apex. This sensing at the apex, it has been found, gives greatly improved resolution since the pulse width at the apex of the pulse is a much better indication of target size than the pulse width at the base of the pulse. A preferred circuit for selecting the apex width of the pulse includes first and second channels to which the input pulses are applied. The second channel includes a threshold circuit biased to a value corresponding to the portion of the top of the pulse it is desired to pass to the discriminator. For example, if the top 2 volts of each pulse is to be passed, the bias setting for the threshold circuit would be adjusted to 2 volts. The thresholded pulse output of the second channel is subtracted from the input pulse in the first channel and the resulting difference pulse is applied to a pulse width discriminator.

The invention will be described in greater detail by reference to the following description taken in connection with the accompanying drawing in which:

FIG. 1 is a block circuit diagram of a preferred form of the present invention;

FIG. 2 is a drawing of waveforms present at various points in the circuit of FIG. 1; and FIG 3 is a schematic circuit diagram of the circuit shown in block form in FIG. 1.

Similar reference characters are applied to similar elements throughout the drawings.

In FIGS. 1 and 2, radar receiver 10 receives return radio frequency pulses (echoes) from ground and from targets of interest. These return pulses may vary in both amplitude and width, and appear at the receiver output lead 12 as video pulses. In a typical system in which the radar transmitter pulse has a width of the order of 1 microsecond, the received return pulse may be from 1 microsecond to several microseconds or more in width.

The upper channel A includes a delay line 14 which slightly delays the input pulses. The reason will become apparent from the discussion which follows. The delayed pulses are applied through a clamp 16 to a difference amplifier 18. The purpose of the clamp, which may be a diode or the like, is to clamp the baseline of the pulses to ground or some other convenient reference voltage level. The clamped pulses $a$ are shown in FIG. 2a. For purposes of the discussion, the three pulses shown are of different amplitudes, the first being 4 volts, the second 10 volts, and the third 16 volts. Assume for the purposes of the present discussion that it is desired to compare the top 2 volt portions of each pulse. These portions are shown cross-hatched in FIG. 2a.

The video pulses at lead 12 are applied to a pulse width stretcher 20 in the lower channel B. In a typical system in which the transmitted pulse is 1 microsecond in duration, the pulse width stretcher may stretch the input pulses about 4/10 of a microsecond. Since, as will be shown, the stretched pulse in channel B is to be subtracted from the corresponding pulse in the upper channel A, it is desirable slightly to delay the pulse in channel A, by means of the delay line 14. In a typical circuit employing 1 microsecond transmitted pulses and a 4/10 microsecond pulse stretcher, a delay of 2/10 of a microsecond for delay line 14 is suitable. The stretched pulse output of stretcher 20 in channel B is shown in FIG. 2b.

The stretched pulses $b$ are applied to threshold circuit 22 the purpose of which is to pass those portions of the stretched pulse of greater than a given amplitude. In the present instance, it is desired to obtain from the input pulses the same 2 volt portion below the pulse apex of each of the pulses. In this case, the threshold circuit is adjusted to have a 2 volt bias setting as indicated by the dashed line in FIG. 2b. The threshold pulse is applied through a clamp 24 which has the same purpose as clamp 16 in the upper channel, as the second input to difference amplifier 18. The clamped, thresholded pulse is shown in FIG. 2c.

The difference amplifier 18 subtracts the substantially coincident pulses $c$ from pulses $a$ to obtain pulses $d$. It will be noted that the cross-hatched areas corresponding to the apex portion desired of the input pulses extend from zero volts to 2 volts. These pulses may be applied through pulse width discriminator 26 to a display 28 such as plan position indication (PPI) display employing an oscilloscope. Preferably, the pulse width discriminator includes a diode clipper 19 for eliminating the negative going portions from pulses $d$ so as to produce pulses $e$ at the discriminator input circuit.

In the example chosen for illustration, the 2 volt apex portion of each pulse is applied to the pulse width discriminator 26. The invention is not limited to this specific value, and any other desired value may be obtained by suitable adjustment of the threshold circuit 22.

In FIG. 3, with the possible exception of the pulse stretcher, the individual circuit elements are conventional and operate in the manner already described. The pulse stretcher consists of a number of diodes 32, 34, 36 and 38 connected to energize successive points along a length of delay line 30. The pulse to be stretched is applied to input lead 40. It passes directly through diode 38 and appears at output lead 42. Simultaneously, the successive sections of the delay line are energized through the diodes 32, 34 and 36. When the wavefront ceases at lead 40, the diodes stop conducting and the input pulse then travels down the delay line. The differently delayed pulses mix with the bypassed pulse at lead 42 to form a stretched pulse.

The threshold circuit 22 includes diodes 44 and 46, and a voltage divider 48 for biasing the diode. In operation, adjustment of the voltage divider 48 controls the forward bias voltage applied to diode 46 and this, in turn, controls the reverse bias voltage applied to diode 44. Accordingly, adjustment of voltage divider 48 controls the voltage level which must be exceeded by the pulse at lead 42 before it passes through the diode 44. Clamp 24 following the threshold circuit is conventional and clamps the threshold pulse to a reference voltage level, ground in the present instance.

In the upper channel A the delay line 14 is preferably a distributed circuit delay line which is broad band so that it produces negligible pulse distortion. Clamp 16 is conventional and performs the same function as clamp 24 in channel B. The difference amplifier consists of a pair of cathode coupled triodes, one receiving the delayed pulse output of channel A and the other the thresholded pulse output of channel B.

As already mentioned, the clipper 19 is conventional and may consist of a biased diode. One of a number of different type pulse discriminators may be employed for stage 26. For example, the discriminators described in Ostergren Patent No. 2,851,598 and Howell Patent No. 2,879,504 are both suitable.

In the circuit described, the output of the difference amplifier is applied to the display through a pulse width discriminator. However, the circuit of the invention provides some degree of clutter reduction even without the pulse width discriminator. The circuit acts as an instantaneous automatic gain control on individual video pulses and it therefore may be adjusted by means of divider 48 to reduce the high amplitude ground clutter pulses, without widening them, to the same level as anticipated target return pulses. This reduces the "blooming" or saturation of the display by the ground return pulses.

What is claimed is:

1. A circuit for passing a portion of an input pulse extending from its maximum amplitude level to a lower amplitude level comprising, in combination, a threshold circuit biased an amount equal to the difference between said amplitude levels for passing the portion of the pulse of greater than said bias level; and means including a subtracting circuit to which are applied the pulse passed by said threshold circuit and the input pulse of greater amplitude than said passed pulse for subtracting said passed pulse from said input pulse to obtain at the output of the subtracting circuit a pulse that is a peak portion of said input pulse.

2. A circuit for passing a portion of an input pulse extending from its maximum level to a lower amplitude level comprising, in combination, a pulse stretcher in one channel for stretching said input pulse; a threshold circuit in said one channel biased an amount equal to the difference between said amplitude levels for passing the portion of the pulse of greater than said bias level; a delay line in a second channel for delaying said input pulse sufficiently to make it substantially coincident with the thresholded pulse; and means including a subtracting circuit connected to both of said channels so that there is applied to said subtracting circuit the pulse passed by said threshold circuit and the delayed pulse of greater amplitude than said passed pulse for subtracting said passed pulse from said delayed pulse to obtain at the output of the subtracting circuit a pulse that is a peak portion of said delayed pulse.

References Cited in the file of this patent

UNITED STATES PATENTS

| | | |
|---|---|---|
| 2,419,548 | Grieg | Apr. 29, 1947 |
| 2,489,297 | Labin et al. | Nov. 29, 1949 |
| 2,915,797 | Segerstrom | Dec. 1, 1959 |